United States Patent [19]
Michie, III et al.

[11] 3,777,502
[45] Dec. 11, 1973

[54] METHOD OF TRANSPORTING LIQUID AND GAS

[75] Inventors: James C. Michie, III; Richard C. M. Calvert, III, both of Newport News, Va.

[73] Assignee: Newport News Shipbuilding and Dry Dock Company, Newport News, Va.

[22] Filed: Mar. 12, 1971

[21] Appl. No.: 123,569

[52] U.S. Cl............... 62/55, 62/260, 137/340, 165/45, 165/154, 166/DIG. 1
[51] Int. Cl.............................................. F17d 1/04
[58] Field of Search.............. 138/111, 113, 114, 138/115; 137/1, 13, 340; 48/190, 191; 62/260, 55, 52; 165/45, 154; 166/DIG. 1, 57, 305 D

[56] References Cited
UNITED STATES PATENTS

| 2,979,310 | 4/1961 | Nicholson | 165/143 |
|---|---|---|---|
| 3,674,086 | 7/1972 | Foster | 165/1 |
| 3,650,119 | 3/1972 | Sparling | 62/55 |
| 2,770,104 | 11/1956 | Sweynor | 62/513 X |
| 3,110,324 | 11/1963 | De Haan | 138/114 X |
| 3,564,862 | 2/1971 | Hasheimi et al. | 62/260 X |
| 2,181,099 | 11/1939 | Pyle | 166/57 |
| 3,110,754 | 12/1963 | Witort et al. | 138/114 X |
| 3,537,485 | 11/1970 | March | 138/111 X |
| 3,472,314 | 10/1969 | Balch | 165/45 X |
| 3,380,530 | 4/1968 | McConell et al. | 166/57 X |
| 3,397,745 | 8/1968 | Owens et al. | 166/57 |
| 3,511,282 | 5/1970 | Willhite et al. | 138/113 |

OTHER PUBLICATIONS

Alaskan Completions Will Be Complicated "World Oil" Jan., 1970 p. 85

*Primary Examiner*—Meyer Perlin
*Assistant Examiner*—Donald C. Capossela
*Attorney*—David H. Semmes

[57] ABSTRACT

Method of simultaneously transporting liquid and gas within a pipeline, such that the gas serves as an insulator for the liquid and as a sealant for the liquid in case of pipeline failure. A liquid passage is supported substantially axially with respect to an outer gas passage, such that the gas flows annularly of the flowing liquid.

1 Claim, 14 Drawing Figures

INVENTORS
JAMES C. MICHIE, III
R. C. M. CALVERT, III
BY David H. Semmes
ATTORNEY

INVENTORS
JAMES C. MICHIE, III
R. C. M. CALVERT, III

1

METHOD OF TRANSPORTING LIQUID AND GAS

BACKGROUND OF THE INVENTION

1. Field of the Invention

Oil pipelines, particularly pipelines for tranporting crude oil under permafrost conditions. A shortcoming in the proposed Trans Alaska Pipeline System (TAPS) has been the necessity to provide for exterior insulation of the crude oil pipeline. Inasmuch as TAPS was planned to travel 85 percent of its 800 miles through permafrost, the 150° F. temperature of the crude oil requires that the pipeline be laid on or above an extensive gravel bed and be covered with insulation. This was required in order to prevent thawing of the permafrost with consequential damage to the tundra and the sinking of the pipeline foundation. This increases the cost of the pipeline tremendously and, therefore, several solutions have been advanced. The Russians, for example, have laid a 200 mile coated pipeline across frozen tundra in the Taimyr Peninsula. The pipeline has been built in zigzag fashion with flexible connections and is supported on H-frames over the tundra. This permits the pipeline to move like an accordian, as extremes of hot and cold cause expansion and contraction. Also, within the Alaskan environment, TAPS is required to travel 40 percent of its distance through a major earthquake zone, the pipeline southern terminus being 30 miles from the epicenter of the worst earthquake in Alaskan history. Therefore, there has been a twofold problem of avoiding damage to the tundra by melting, or by spillage occasioned by earthquake.

2. Description of the Prior Art

Prior art searching has developed the following U.S. Pat. Nos.: Dissosway 964,001; Forsyth, et al, 2,895,512; Witort, et al, 3,110,754; Lee, et al, 3,169,576; Wittgenstein 3,430,484;

Dissosway discloses the use of two concentric pipes, the outer pipe carrying water for general consumption while the inner pipe carries an emergency supply of water, protected by the outer pipe. Forsyth, et al, uses three concentric pipes wherein a "stagnant, gaseous fluid" is maintained exteriorally of an inner line which conveys high pressure steam.

Lee, et al, assigned to Freeport Sulphur Company, teaches the mining of sulphur by using concentric pipes bearing hot water.

Wittgenstein uses chemically treated and neutralized water as the insulator in the outside pipe, it being contemplated that the inner pipe would be used for the transportation of natural gas.

None of the prior art patents suggests the simultaneous transportation of natural gas annularly with respect to the flowing axial crude, the natural gas serving as an insulator and pressure sealant for the crude. Also, the prior art does not suggest expanding the gas by decreasing the pressure so as to obtain the desired temperature drop for insulation of the hot crude being piped. Within the frozen Alaskan environment, there exists, also, the as yet unsolved problem of disposing of drilling mud and human wastes.

SUMMARY OF THE INVENTION

According to the present invention, a liquid pipeline is interiorally partitioned so as to provide a separate liquid conveying passage and a separate gas conveying passage. Liquid is flowed through the liquid passage, while gas is injected into the adjacent gas passage, serving as an insulator therefor. In the preferred mode of invention, the liquid passage is supported axially of the gas passage such than an annulus of flowing gas surrounds the liquid passage. As a result, the pipeline may be positioned upon the tundra without deleterious melting effects. Also, in the event of failure of the inner pipeline, the insulating gas being at a high pressure seals the axial liquid pipeline, preventing spillage upon the ambient ecology. Modifications of invention include counter-current flowing of drilling mud and human waste from the drilling site and within the gas conveying passage. Also, potable water, heated by the flowing crude oil, might be transported in the gas conveying passage.

DESCRIPTION OF THE PREFERRED EMBODIMENTS

Figure 1:
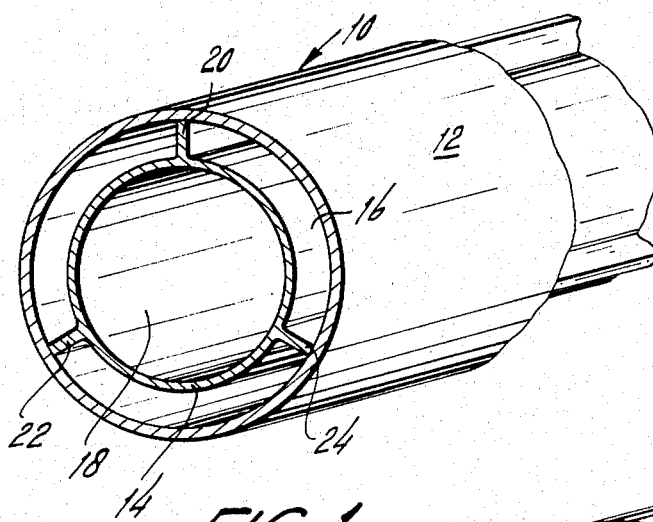
FIG. 1 is a fragmentary perspective of a proposed pipeline, constructed for transporting of oil and gas, according to the present method.

In FIG. 1, there is illustrated a type of pipe that may be utilized for practising the present method of transporting liquid and gas. Pipe 10 is illustrated as comprising outer wall 12 defining, with inner pipe 14, an annulus 16 for the injection of gas. Axial liquid flowing passage 18 is defined by the inner walls of inner pipe 14. A plurality of radially extending continuous or discontinuous vanes 20, 22, and 24 may be used for partitioning the annulus and supporting the inner pipe axially with respect to outer pipe 12.

Figure 2:
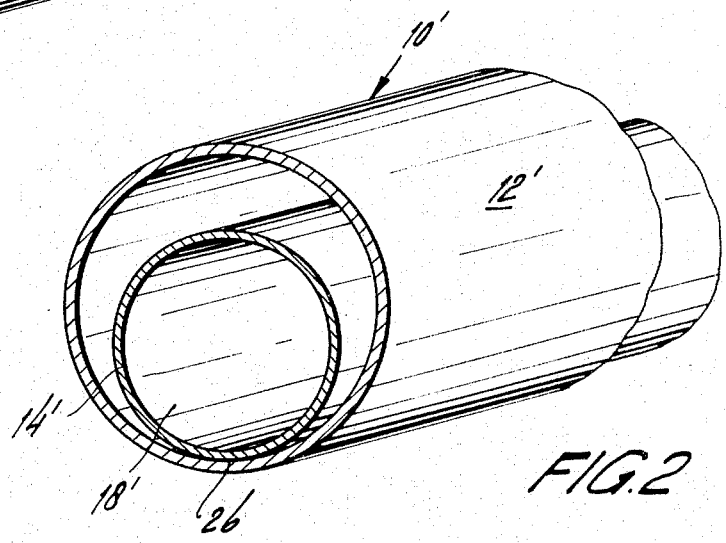
FIG. 2 is a fragmentary perspective of a modified pipeline for transporting oil and gas according to the present method.

In FIG. 2, there is illustrated a modification wherein inner pipe 14' defines liquid passage 18' and rests at its lower outer surface 26 upon the lower inner surface of outer pipe 12', thus providing for longitudinal flexing and transverse moving of the inner pipe 14' with respect to the insulating outer pipe 12'.

In FIGS. 3–14, there are represented a plurality of multi-segment pipe modifications.

Figure 3:
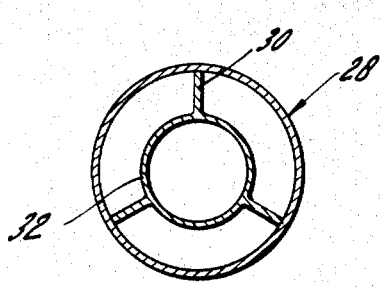
FIG. 3 is yet another modification, employing three partitioning and supporting vanes.

In FIG. 3, there is illustrated the four segment modification wherein a plurality of longitudinally extending vanes 30 partition the annulus between outer pipe 28 and inner pipe 32 into four segments. It is proposed that gas with varying density and pressure characteristics would be transmitted to three outer segments while liquid would be transmitted through the inner section.

Figure 4:
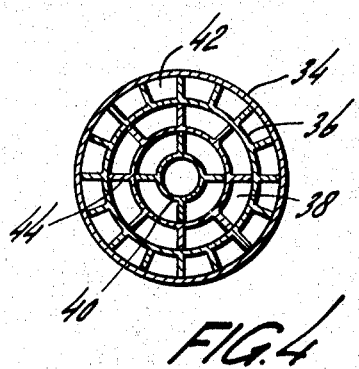
FIG. 4 is a 28 segment modification.

In FIG. 4, the 28 segment mode is illustrated wherein concentric pipes 34, 36, 38, and 40 are supported with respect to each other and partitioned by means of horizontal vanes 44 and vertical vanes 42, as well as a plurality of radially extending intermediary vanes (not numbered).

Figure 5:
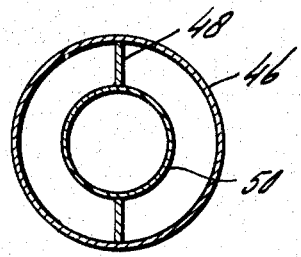
FIG. 5 is a three segment modification.

In FIG. 5, there is illustrated the three segment modification wherein inner pipe 50 is supported axially with respect to outer pipe 46 by means of vertical baffles 48.

Figure 6:
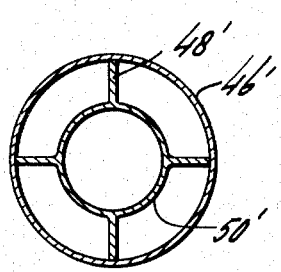
FIG. 6 is a five segment modification.

In FIG. 6, there is illustrated the five segment modification wherein inner pipe 50' is supported co-axially with respect to outer pipe 46' by means of baffles 48'.

Figure 7:
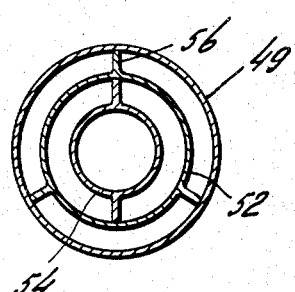
FIG. 7 is a six segment modification.

In FIG. 7, there is illustrated the six segment modification wherein concentric pipes 48, 52, 54 are supported with respect to each other by means of vanes 56.

Figure 8:
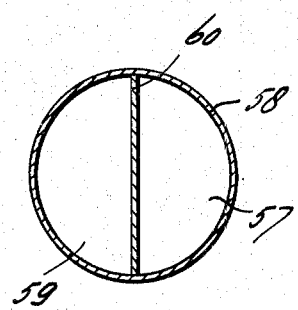
FIG. 8 is a two segment modification.

In FIG. 8, a single longitudinally extending baffle 60 bisects conduit 58 such, for example, that natural gas could be sent through passageway 57 and liquid crude may be sent through passageway 59.

Figure 9:
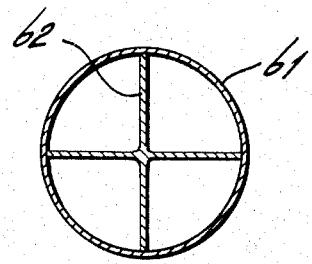
FIG. 9 is a four segment modification.

In FIG. 9, there is illustrated a modification wherein outer conduit 60 has a plurality of inner vanes 62 which partition the interior into quadrant conduits.

Figure 10:
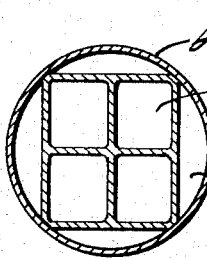
FIG. 10 is an eight segment modification.

In the FIG. 10 modification, there is illustrated the modification where outer pipe 64 is partitioned inwardly into rectangular segments 66 and peripheral semi-circular sgments 67.

Figure 11:
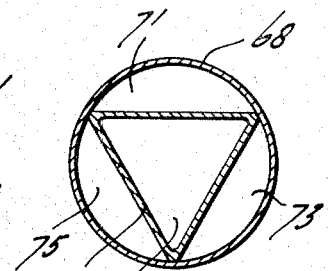
FIG. 11 is a four segment modification.

In the FIG. 11 modification, outer conduit 68 supports triangular inner conduit 72, defined by equilateral vanes 70 and semi-circular outer conduits 71, 73, and 75.

Figure 12:
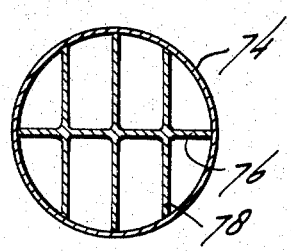
FIG. 12 is an eight segment modification.

In the FIG. 12 modification, outer conduit 74 is inwardly partitioned by means of a horizontal baffle 76 and vertical baffles 78, so as to define eight segments.

Figure 13:
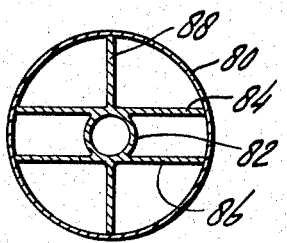
FIG. 13 is a seven segment modification.

In FIG. 13, outer conduit 80 supports inner conduit 82 by means of vertical partitions 88 and horizontal partitions 86, so as to define seven segments.

Figure 14:
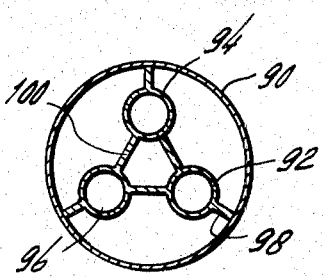
FIG. 14 is yet another seven segment modification.

In FIG. 14, outer conduit 90 supports inner conduits 92, 94, and 96 by means of vanes 98 and 100 to provide seven segments.

Applicants have conceived a concentric pipeline which would produce significant advantages when utilized as an integral part of an oil and gas pipeline transportation system. The most important advantage of the pipeline is that it would provide double protection from ecologically dangerous oil spills by carrying the oil in the inner pipe and the natural gas in the outer pipe. By maintaining a higher pressure on the gas than on the oil, the gas would be forced into the oil, rather than vice versa, should a rupture occur in the inner pipe. Carrying the oil in the inner pipe also lessens the potential ecological hazard of an oil spill due to corrosion of an underwater pipeline.

Of economic as well as of environmental significance is the fact that little or no insulation would be required to prevent thermal pollution. The wellhead temperature and pressure at Prudhoe is about 150° F. and 5,000 psi respectively. When this is reduced to the normal operating pressure of about 800 to 1,000 psi, the gas temperature drops to about 35° F. This is a small difference with the surrounding sea water or permafrost temperatures.

The concentric pipeline should offer cost savings in the laying operation since handling and dredging or trenching would be easier than separate or parallel pipelines. It would also allow the desired simultaneous production of oil and gas.

The proposed method of transporting oil and gas provides environmental protection through the double pipe protection from oil spills, simultaneous oil and gas transmission, early systems start-up due its immediate technological practicability, and a very low transportation cost per barrel, as opposed to other systems. Also, since less insulation is required, there is a lower installation cost than parallel pipelines, and less corrosion allowance for the inner pipe, if made of steel.

Manifestly, the transport pipes may be varied and variously supported with respect to each other without departing from the spirit of the invention, as defined in the claims.

We claim:

1. Method of transporting hot crude oil liquid and natural gas over permafrost, comprising:
  A supporting an inner crude oil liquid pipeline substantially concentrically within an outer natural gas pipeline, such that there is defined an inner crude oil liquid passage and a surrounding annular gas passage;
  B flowing crude oil liquid through said inner liquid passage;
  C injecting natural gas into said annular passage;
  D flowing said gas simultaneously with flowing of said liquid; and
  E freely supporting the lower exterior surface of said liquid passage upon engaging the lower inner surface of said annular gas passage, so as to permit longitudinal and transverse flexing of said inner liquid passage with respect to said surrounding annular passage.

* * * * *